United States Patent [19]
Andric et al.

[11] Patent Number: 6,163,765
[45] Date of Patent: *Dec. 19, 2000

[54] SUBBAND NORMALIZATION, TRANSFORMATION, AND VOICENESS TO RECOGNIZE PHONEMES FOR TEXT MESSAGING IN A RADIO COMMUNICATION SYSTEM

[75] Inventors: Oleg Andric, West Palm Beach; Lu Chang, Boca Raton; Jian-Cheng Huang, Lake Worth; Arthur Gerald Herkert, Boynton Beach, all of Fla.

[73] Assignee: Motorola, Inc., Schaumburg, Ill.

[ * ] Notice: This patent is subject to a terminal disclaimer.

[21] Appl. No.: 09/050,184

[22] Filed: Mar. 30, 1998

[51] Int. Cl.$^7$ .................................................. G10L 15/02
[52] U.S. Cl. .......................... 704/204; 704/224; 704/217; 704/235
[58] Field of Search ................................... 704/235, 240, 704/204, 217, 224; 455/563; 379/88.14

[56] References Cited

U.S. PATENT DOCUMENTS

| | | | |
|---|---|---|---|
| 4,058,676 | 11/1977 | Wilkes et al. | 704/220 |
| 4,827,516 | 5/1989 | Tsukahara et al. | 704/224 |
| 5,485,543 | 1/1996 | Aso | 704/267 |
| 5,636,325 | 6/1997 | Farrett et al. | 704/258 |
| 5,659,597 | 8/1997 | Bareis et al. | 455/563 |
| 5,806,022 | 9/1998 | Rahim et al. | 704/205 |
| 5,828,993 | 10/1998 | Kawauchi | 704/202 |
| 5,905,969 | 5/1999 | Mokbel et al. | 704/203 |

OTHER PUBLICATIONS

Young, Jansen, Odell, Ollason and Woodland, *The HTK Book*, Entropic Cambridge Research Laboratory, Cambridge, England.

Joseph Picone, Continuous Speech Recognition Using Hidden Markov Models, IEEE ASSP Magazine, pp. 26–41, Jul. 1990.

Normandin, Cardin and De Mori, High–Performance Connected Digit Recognition Using Maximum Mutual Information Estimation, IEEE Transactions on Speech and Audio Processing, vol. 2, No. 2, Apr. 1994, pp. 299–311.

*Primary Examiner*—David R. Hudspeth
*Assistant Examiner*—Donald L. Storm
*Attorney, Agent, or Firm*—Randi L. Dulaney; Philip P. Macnak

[57] ABSTRACT

A radio communication system includes a voice recognition system (221) for converting (400) a caller's voice message to a textual speech message. The textual speech message is then transmitted to an intended selective call radio (122). To perform these functions, the radio communication system includes a caller interface circuit (218), a transmitter (116), and a processor (222). To perform voice-to-text conversion, the processor is adapted to cause the caller interface circuit to sample a voice signal generated by the caller during a plurality of frame intervals, and to apply a Fourier transform thereto, thereby generating spectral data. The spectral data is subdivided into a plurality of bands. The spectral envelope of the spectral data is then filtered out to generate filtered spectral data. A Fourier transform is applied thereto to generate an autocorrelation function for each band. From the autocorrelation function of each band, a magnitude is determined, which is representative of the degree of voiceness of each band. The degree of voiceness for each band is then applied to a corresponding plurality of phoneme models, which are used to derive a textual equivalent of speech from the voice signal. The textual equivalent of speech is then transmitted to the selective call radio by way of the transmitter.

26 Claims, 8 Drawing Sheets

SUBBAND NORMALIZATION, TRANSFORMATION, AND VOICENESS TO RECOGNIZE PHONEMES FOR TEXT MESSAGING IN A RADIO COMMUNICATION SYSTEM

RELATED INVENTIONS

The present invention is related to the following inventions, which are assigned to the same assignee as the present invention:

U.S. Pat. No. 6,073,094 issued Jun. 6, 2000 by Chang et al. entitled "Voice Compression by Phoneme Recognition and Communication of Phoneme Indexes and Voice Features."

U.S. application Ser. No. 09/067,779, filed Apr. 27, 1998 by Cheng et al. entitled "Reliable Conversion of Voice in a Radio Communication System and Method Therefor."

FIELD OF THE INVENTION

This invention relates in general to voice recognition systems, and particularly, to a voice recognition system in a radio communication system and method therefor.

BACKGROUND OF THE INVENTION

Presently, voice recognition systems are becoming popular with consumers of conventional computers due to the availability of continuous speech recognition systems. These applications are generally tailored for speaker-dependent voice recognition. That is, to provide a high degree of accuracy in the conversion of voice to a textual message, the continuous speech recognition system must be trained by a particular speaker's voice. This is generally performed by having the speaker read a canned message of several paragraphs, which is then recorded and analyzed by the speech recognition system to develop a set of statistical models of the speaker's voice. These models are later used by the continuous speech recognition system to convert the speaker's voice signals into a textual message.

Although the present approach provides a relatively high degree of accuracy in the process converting voice to a textual message, a need for higher degrees of accuracy approaching a flawless conversion is desirable. Present continuous speech recognition systems suffer several disadvantages in reaching a flawless conversion standard. For example, present algorithms rely heavily on the spectral envelope features of the analyzed speech signals to generate a textual message equivalent. This is disadvantageous because such a method fails to account for other features in speech such as the shape of the speech spectrum, which may be helpful in improving the accuracy of voice conversion. Additionally, present algorithms are not well adapted to recognize speech at a high degree of accuracy from speakers who have not trained the system with their particular voice characteristics. The availability of speaker-independent voice recognition systems would be especially useful in radio communications systems that are intended for transmitting caller initiated messages to selective call radios such as, for example, pagers.

Accordingly, what is needed is a voice recognition system that converts voice signals to a textual message at a higher degree of accuracy than provided by prior art voice recognition systems. It would be desirable for the voice recognition system to convert voice signals that originate from either speaker-dependent or speaker-independent voice signals. In addition, it would be desirable that the voice recognition system be adapted to operate in a radio communication system that translates caller initiated voice messages to textual messages, and that transmits the textual messages to one or more selective call radios.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

DESCRIPTION OF THE PREFERRED EMBODIMENT

Figure 1:
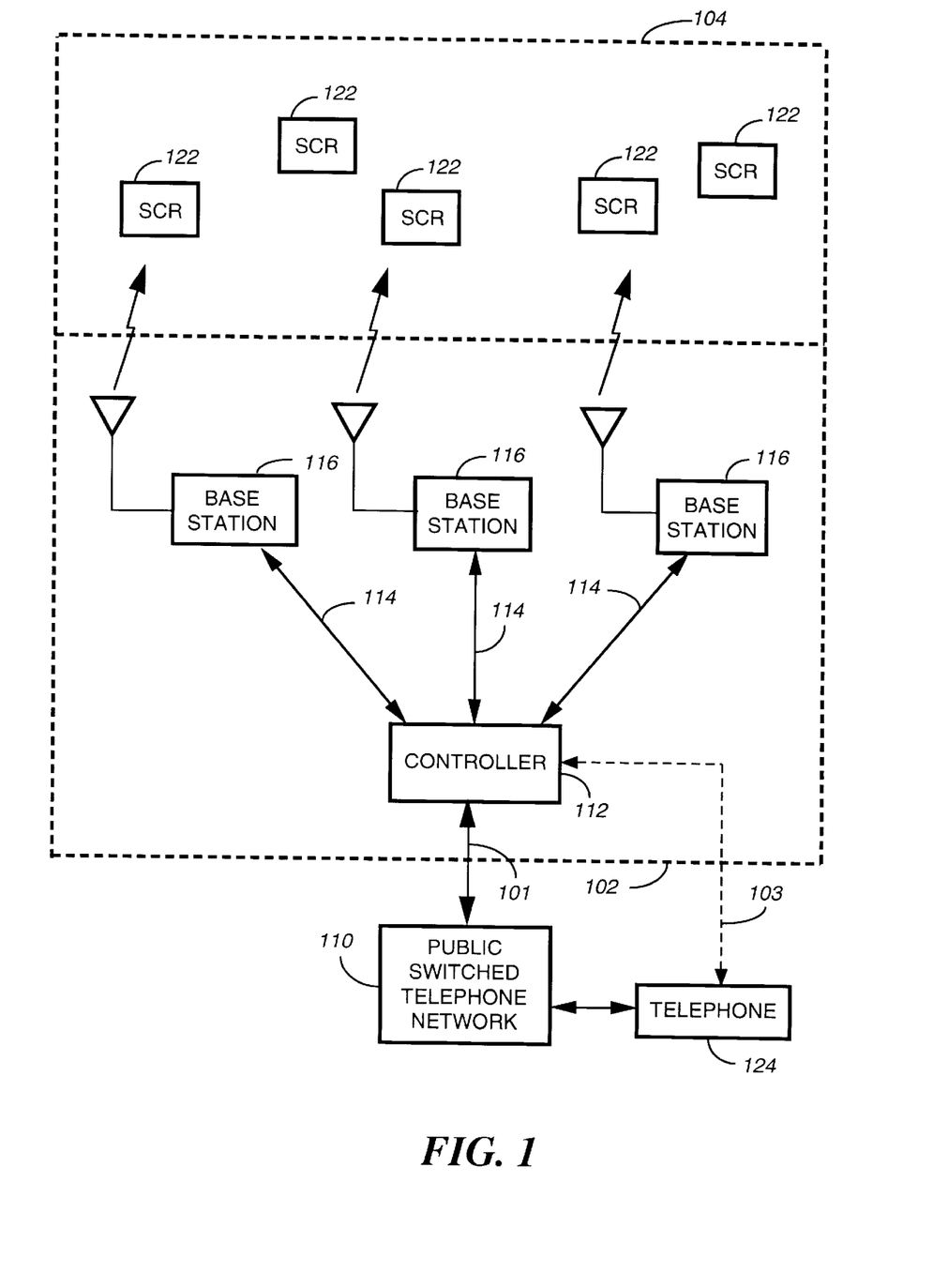
FIG. 1 is an electrical block diagram of a radio communication system according to the present invention.

FIG. 1 is an electrical block diagram of a radio communication system comprising a fixed portion 102 and a portable portion 104. The fixed portion 102 includes a controller 112 for controlling operation of a plurality of base stations 116 by way of conventional communication links 114, such as microwave links. The portable portion 104 includes a plurality of SCR's (selective call radios) 122 for receiving messages from the base stations 116 under the control of the controller 112. It will be appreciated that, alternatively, the radio communication system may be modified to support two-way communication between the SCR's 122 and the base stations 116. This modification may be achieved by the use of radio transceivers at both the SCR's 122 and the base stations 116.

Turning to the operation of the controller 112, we find that the controller 112 receives messages from callers utilizing a conventional telephone 124 for communicating with a conventional PSTN (public switch telephone network) 110. The PSTN 110 then relays messages to the controller 112 through a conventional telephone line 101 coupled to the controller 112. Upon receiving messages from the PSTN 110, the controller 112 processes the messages, and delivers them to the base stations 116 for transmission to designated SCR's 122. It will be appreciated that, alternatively, the telephone 124 may be directly coupled to the controller by way of a conventional telephone line 103.

Figure 2:
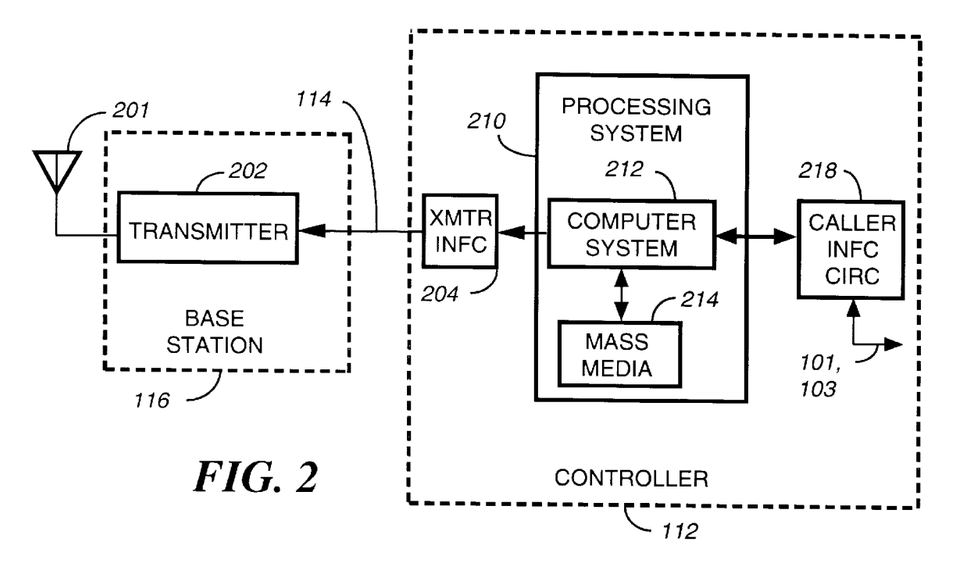
FIGS. 2 and 3 are electrical block diagrams of a fixed portion of the radio communication system according to the present invention.
Figure 3:
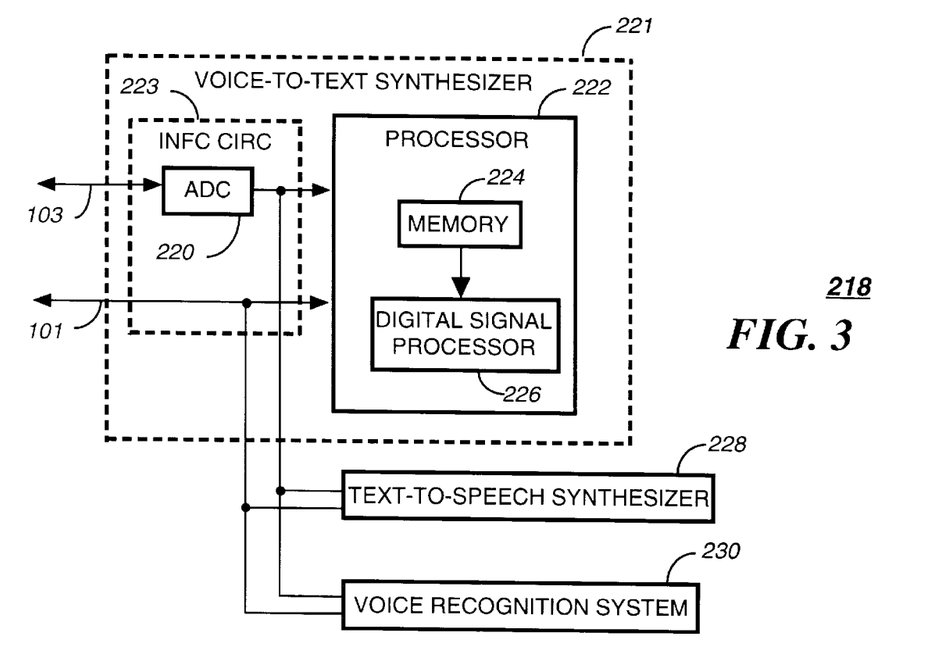

FIGS. 2 and 3 are electrical block diagrams of the fixed portion 102 of the radio communication system according to the present invention. The electrical block diagram of the fixed portion 102 includes the elements of the controller 112 and the base stations 116. The controller 112 comprises a conventional processing system 210 for controlling operation of the base stations 116, a caller interface circuit 218, and a transmitter interface 204 for communicating messages to the base stations 116. The caller interface circuit 218 is utilized for receiving messages from the PSTN 110 or, alternatively, for receiving messages from a direct telephone connection 103. The processing system 210 includes conventional hardware such as a computer system 212 (with built-in random access memory-RAM) and mass media 214 (e.g., a conventional hard disk) to perform the programmed operations of the controller 112. The base stations 116 comprise a conventional RF transmitter 202 coupled to an antenna 201 for transmitting the messages received from the controller 112. As noted earlier, the radio communication system may be modified to perform two-way radio communications with the SCR's 122. To accomplish this, the base station 116 of FIG. 2 may be modified to further include a radio receiver to receive messages from the SCR's 122 that are also modified to include a transmitter portion.

Figure 5:
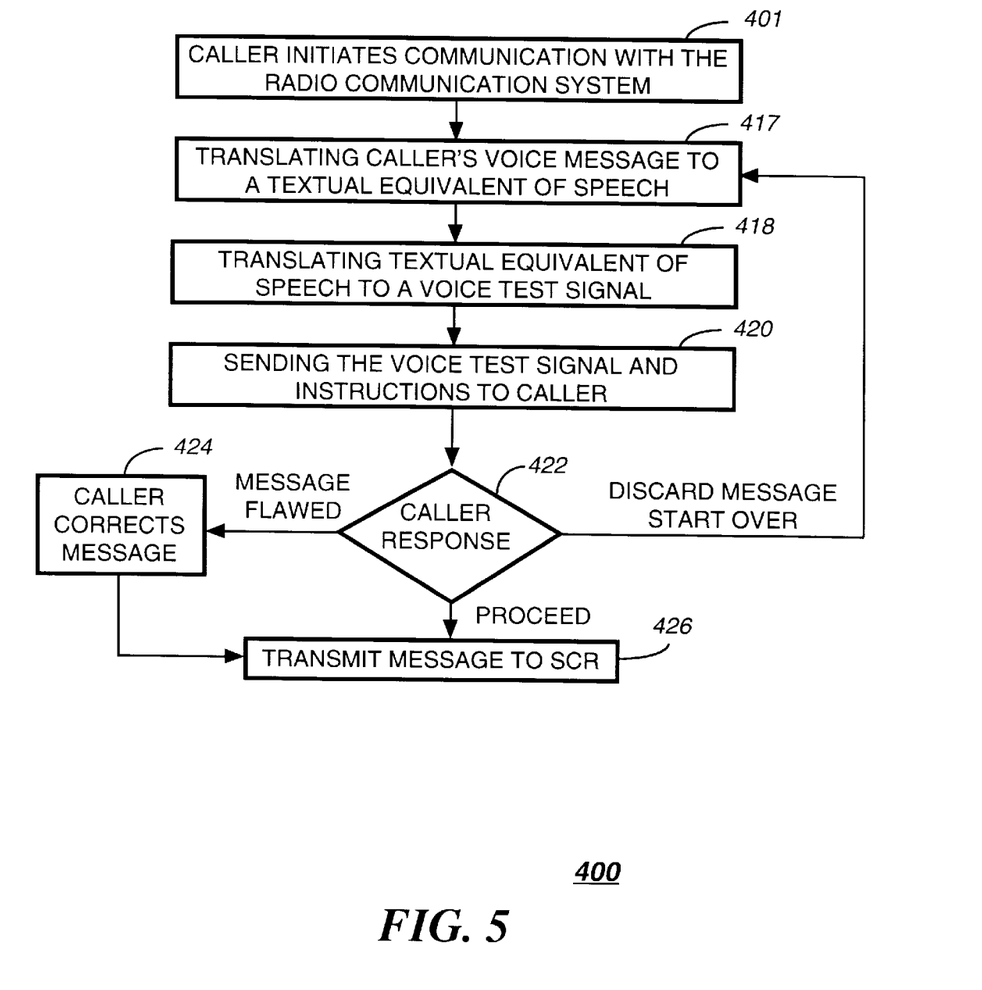
FIGS. 5–6 show flowcharts summarizing the operation of the radio communication system according to the present invention.
Figure 6:
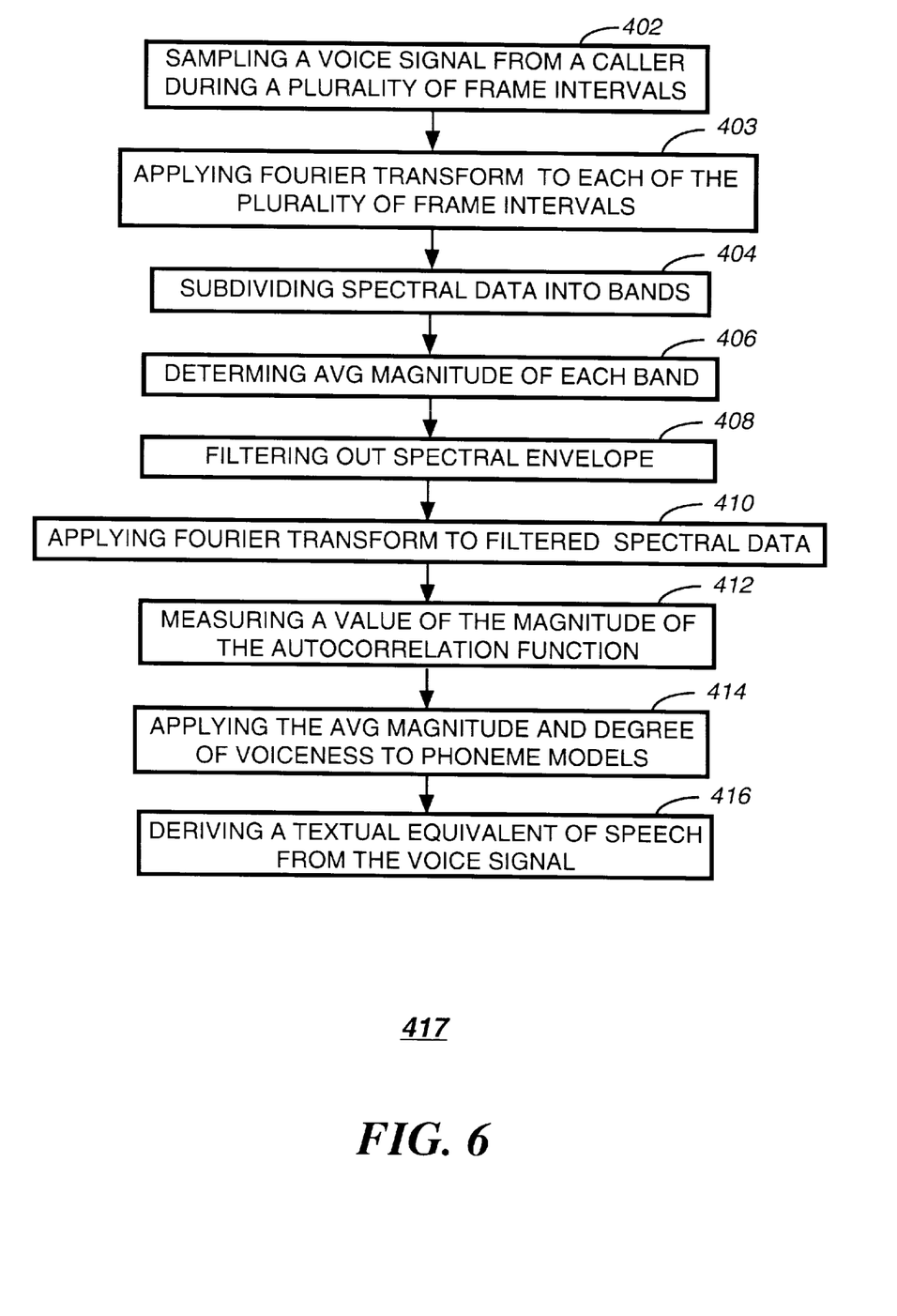

FIGS. 5–6 show flowcharts summarizing the operation of the radio communication system according to the present invention. The flowchart 400 depicts programmed instructions of the controller 112 which are initially stored in the mass media 214 and are operated on the RAM included in the computer system 212 (not shown).

The flowchart 400 begins with step 401 where a caller initiates communication with the radio communication system. As noted earlier, this communication may originate from the PSTN 110 or a direct telephone connection with the controller 112. In step 417, the caller's voice message is converted to a textual equivalent of speech. The textual message is then synthesized back to a voice test signal in step 418. The purpose of synthesizing to a voice test signal is to provide the caller the means to determine if the textual translation was performed flawlessly. In order to make this determination, in step 420, the voice test signal is transmitted through the phone system to the caller. Additionally, the controller 112 sends voice instructions to the caller that define how the caller is to generate a confirmation response signal.

Step 422 is representative of the possible confirmation response signals made available to the caller. Interaction with the caller in one embodiment is performed by way of a conventional voice recognition system programmed into the controller 112, thereby freeing the caller from keypad interactions. The voice recognition system provides voice interaction between the caller and the radio communication system to correct the textual equivalent of speech in the event that the confirmation response signal indicates that the textual equivalent of speech is flawed. Among the available options, the caller may choose to correct the textual message by instructing the radio communication system to discard the original translation and to sample a new voice signal representative of the message intended for the selective call radio. This flow is represented by the transition from step 422 to step 417.

Alternatively, the caller may selectively correct at least one word of the textual message generated by the radio communication system according to voice signals generated by the caller representative of the at least one corrected word. This flow is represented by the transition from step 422 to step 424. Once the textual message has been corrected, the controller 112 proceeds to step 426, whereby the transmitter 202 of the base station 116 is activated to transmit the textual equivalent of speech to the targeted SCR 122. If, however, the controller 112 translated the caller's initial voice message flawlessly to a textual message, then the controller 112 proceeds to step 426 directly.

Figure 7:
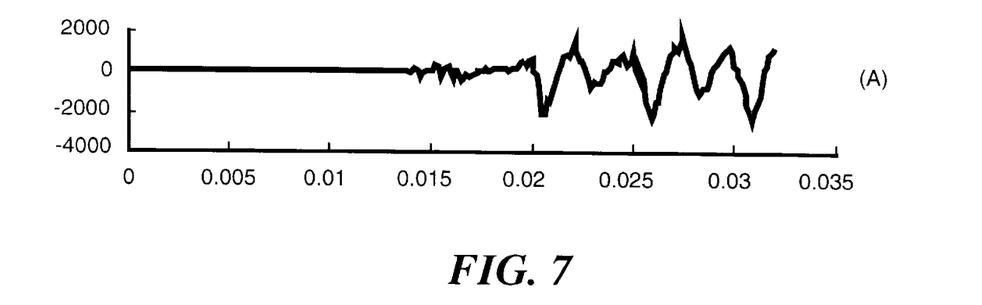
FIGS. 7–10 show graphs representative of the transformations made to voice signals generated by a caller according to the present invention.
Figure 8:
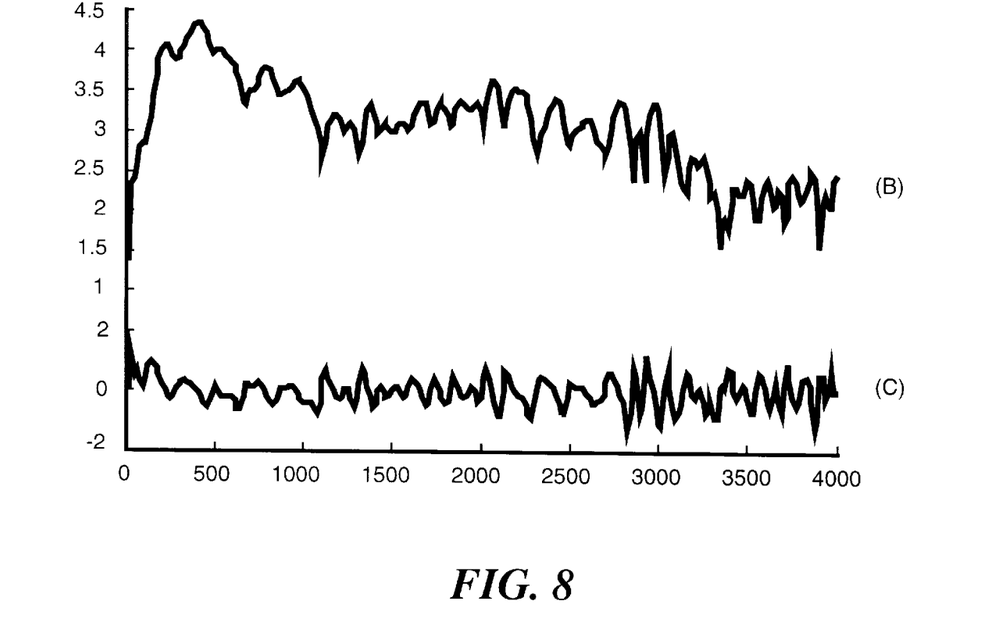

A prominent feature of the present invention provides for a high degree of first-time success in converting a caller's voice message to a textual message flawlessly. The flowchart of FIG. 6 illustrates how the translation of voice-to-text is performed in step 417 at a high success rate. The process of converting voice to a textual message begins with step 402 where a voice signal originated by a caller is sampled. An illustration of a voice signal is shown in FIG. 7. In step 403 the processing system 210 is programmed to apply a Fourier transform to a plurality of frame intervals of the sampled voice signal (e.g., 10–25 ms) to generate spectral data having a spectral envelope for each of the plurality of frame intervals. The Fourier transform applied in this step is preferably a fast Fourier transform. The spectral signal over a frame interval is shown in FIG. 8. Assuming the input speech signal is represented by $x_n$, the following equation describes the result of step 403:

$$P_k = \sum_{n=0}^{N-1} x_n e^{-j\frac{2\pi nk}{N}},$$

where $0 \leq k \leq N-1$.

In step 404, for each of the plurality of frame intervals, the spectral data is subdivided into a plurality of bands, each of the plurality of bands having a predetermined bandwidth (e.g., 400 Hz). It will be appreciated that, alternatively, each band may be of variable bandwidth. In step 406, the processing system 210 determines an average magnitude of the spectral data for each of the plurality of bands. Then in step 407 a logarithmic function is applied to the average magnitude to generate a converted average magnitude. In step 408, the converted average magnitude is then decorrelated (preferably with a discrete cosine transform) to generate spectral envelope features.

The controller 112 then proceeds to step 409 to filter out the spectral envelope from the spectral data of each of the plurality of frame intervals to generate filtered spectral data for each of the plurality of frame intervals. This step preferably comprises the steps of averaging the spectral data of each of the plurality of frame intervals to generate a spectral envelope estimate, and subtracting the spectral envelope estimate from the spectral data. These steps are substantially represented by the function, $$P'_k = f(i) * P_k, \text{ wherein } f(i) = \begin{cases} 1 & 0 \leq i < L \\ -1 & -L < i < 0. \end{cases}$$

Figure 9:
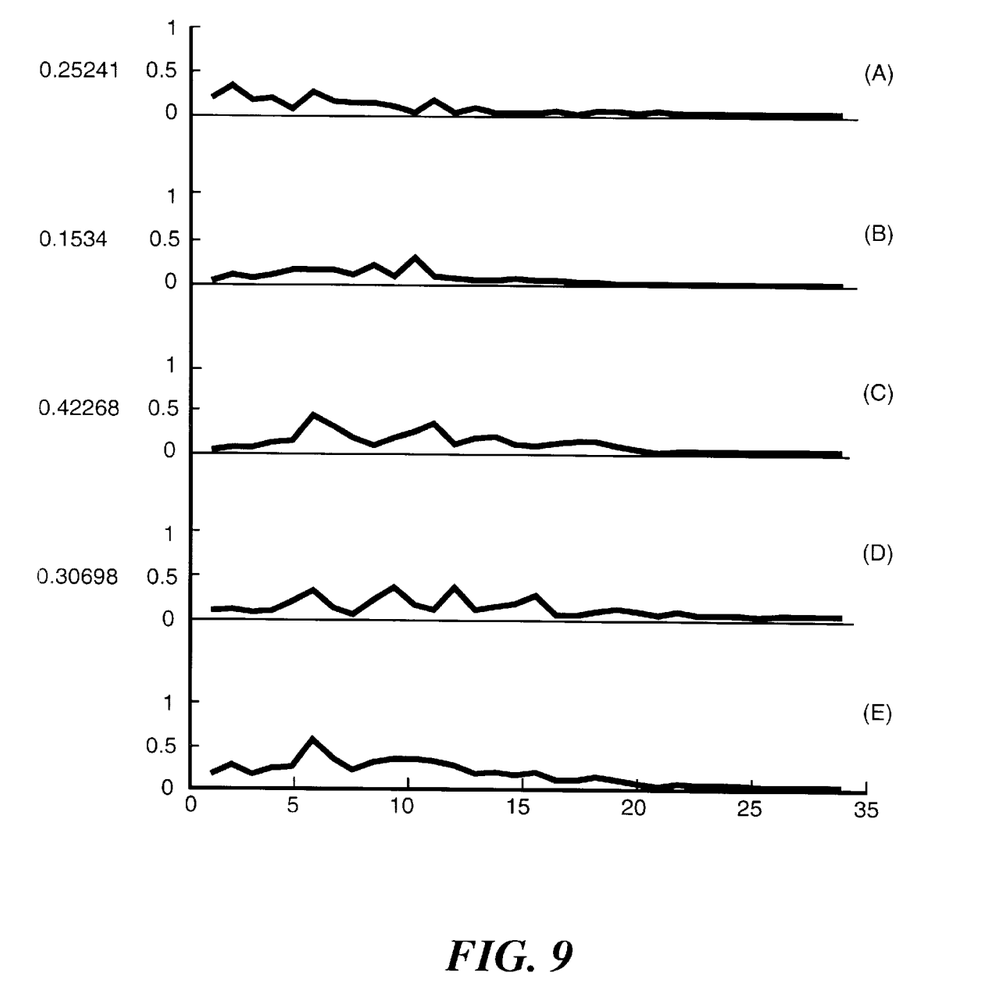

The function f(i) is a 1-D Haar function well known in the art, and $P'_k$ is the convolution of the Haar function with the original spectral data $P_k$. The result of filtering the spectral data is shown in FIG. 9.

Next, in step 410, a fast Fourier transform is applied to the filtered spectral data for each of the plurality of bands to generate an autocorrelation function for each of the plurality of bands. If there is a strong harmonic structure in the original spectral data, the autocorrelation function for each of the plurality of bands will have a high peak value around the value of its pitch period. For this reason, each autocorrelation function is preferably normalized by its corresponding spectral band energy. In step 412, the controller 112 proceeds to measure a value of the magnitude of the autocorrelation function for each of the plurality of bands. The value of the magnitude of the autocorrelation function is defined as a measure of a degree of voiceness for each of the plurality of bands.

There are two embodiments for measuring a value of the magnitude of the autocorrelation function. In a first embodiment, the value of the magnitude of the autocorrelation function corresponds to a peak magnitude of the autocorrelation function. Alternatively, in a second embodiment, for each of the plurality of frame intervals, the value of the magnitude of the autocorrelation function for each of the plurality of bands is determined by: (1) summing the autocorrelation function of each of the plurality of bands to generate a composite autocorrelation function, (2) determining a peak magnitude of the composite autocorrelation function, (3) determining from the peak magnitude a corresponding frequency mark, and (4) utilizing the corresponding frequency mark to determine a corresponding magnitude value for each of the plurality of bands.

Figure 10:
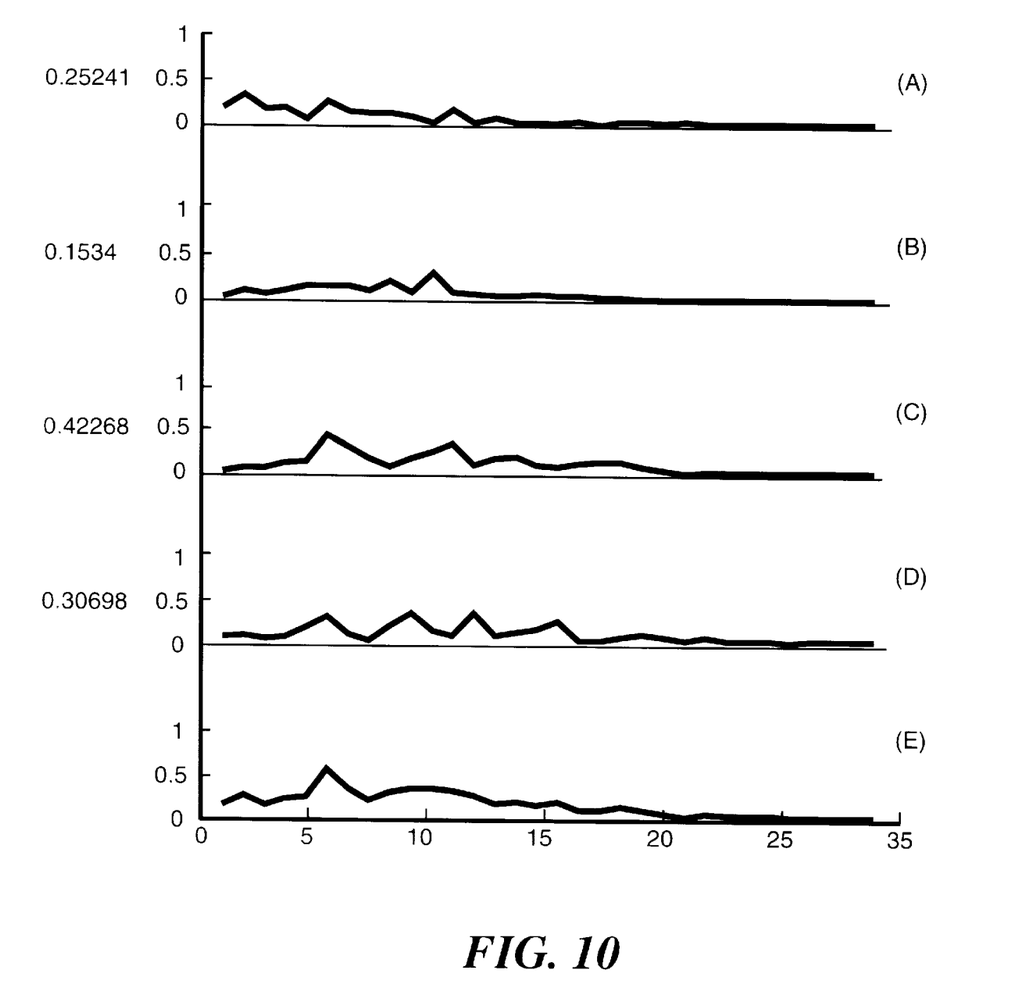

The second embodiment is illustrated in FIG. 10. Graphs (a)–(d) represent the autocorrelation function for each of bands 1–4. Graph (e) is the composite autocorrelation function as a result of summing the autocorrelation functions of bands 1–4. From the composite autocorrelation function a peak magnitude, and a corresponding frequency mark is determined. The corresponding frequency mark is then used to determine a corresponding magnitude value for each of the plurality of bands as shown in graphs (a)–(d).

As noted earlier, the value of the magnitude of the autocorrelation function is a measure of the degree of voiceness for each of the plurality of bands. After determining the degree of voiceness for each of the plurality of bands by either of the foregoing embodiments, in step 414, the spectral envelope features determined in step 408 and the degree of voiceness just discussed is applied to a corresponding plurality of phoneme models. Phoneme models are known in the art as models of speech determined from statistical modeling of human speech. In the art, phoneme models are also commonly referred to as Hidden Markov Models. A phoneme represents the smallest quantum of sound used by a speaker for constructing a word. For example, the word "is" may be decomposed into two phoneme sounds: "ih" and "z." Since individuals of differing cultures may speak with differing dialects, the word "is" may have more than one set of phoneme models to represent mismatched populations. For example, there may be individuals who end the word "is" with a "s" sound, i.e., "ih" and "s."

As a preferred embodiment, the phoneme models are determined over a large population of samples of human speech, which accounts for varying pronunciations based on varying speech dialectics. Deriving phoneme models from a large population allows for the present invention to operate as a speaker-independent voice recognition system. That is, the phoneme models are not dependent on a particular speaker's voice. With speaker-independent descriptions built into a phoneme model library, the controller 112 of the radio communication system can convert the voice of any speaker nation-wide without prior training of the caller's voice to a textual message. It will be appreciated, however, that the present invention may be altered so that a phoneme library may be constructed from training provided by one or more specific speakers, thereby forming a speaker-dependent phoneme library. Notwithstanding this alternative embodiment, the ensuing discussions will focus on a speaker-independent phoneme library.

Based on a speaker-independent phoneme library, the conversion of voice into a textual message, as indicated by step 416, is accomplished by comparing the spectral envelope features of the spectral data for each of the plurality of bands and the degree of voiceness for each of the plurality of bands with a library of speaker-independent phoneme models. From this comparison, a list of likely phonemes are identified, which are then compared to a dictionary of words (from, e.g., the English language) and their corresponding phonemes to derive a textual equivalent of speech from the processed voice signal of the caller. As part of the comparison processes for determining one or more likely phonemes, the following probability function is preferably used:

$$b_j(o_t) = \prod_{s=1}^{S} \left[ \sum_{m=1}^{M_s} c_{jsm} N(o_{st}; \mu_{jsm}, \Sigma_{jsm}) \right]^{\gamma_s},$$

wherein $M_s$ is the number of mixture components in stream s. The variable S for the present invention is equal to 2, which represents the product of two probabilities. That is, one product represents the likelihood of a matched set of phoneme models based on the spectral envelope features of the spectral data per band, and another product represents the likelihood of a matched set of phoneme models based on the degree of voiceness per band. The variable $c_{jsm}$ is weighting factor, while the function N is a multivariate Gaussian function, wherein the variable $o_{st}$ is input data vectors representative of the spectral envelope features and degree of voiceness for each of the plurality of bands, and wherein $u_{jsm}$ and $\Sigma_{jsm}$ are the mean and covariance vectors of each of the phoneme models in the phoneme library. Lastly, the variable $\gamma_s$ is used for providing differing weights to the spectral envelope features probability result versus the degree of voiceness probability result. For example, the spectral envelope features probability result may be given a weight of 1.00 while the degree of voiceness probability result may be given a weight of 1.20. Hence, more importance is given to the outcome derived from the use of degree of voiceness data rather than the spectral envelope features data. It will be appreciated that any weight may be given to either product depending on the application in which the present invention is utilized.

Each of the probability results ($b_j$) is then compared over a stream of the plurality of frames to determine an equivalent textual version of the caller's voice message. In the event the comparison process leads to one or more possible textual streams, the textual stream with the greatest likelihood of success is chosen according to a composite probability result for each branch. Once the textual result with the greatest likelihood of success has been chosen, the controller 112 proceeds to steps 418–426 of FIG. 5 as discussed earlier.

A detailed description of the conversion of voice to a textual message is more fully described in Steve Young, "The HTK Book," Entropic Cambridge Research Laboratory, Cambridge CB3 OAX, England, which is hereby incorporated herein by reference. This article is useful for gaining further insight into the use of the foregoing equation (represented by $b_j$) to predict the likelihood of a stream of phonemes derived from a voice signal. Additionally, the reader is directed to the following introductory materials related to voice recognition systems, which are described in Joseph Picone, "Continuous Speech Recognition Using Hidden Markov Models," IEEE ASSP Magazine, July 1990, pp.26–40, and Yves Normandin, "High-Performance Connected Digit Recognition Using Maximum Mutual Information Estimation," IEEE Transactions on Speech and Audio Processing, Vol. 2, No. 2, April 1994, respectively, which are hereby incorporated herein by reference.

The foregoing method and apparatus for sampling voice signals and for converting them to textual messages is substantially, advantageous over prior art systems. Recalling from the background of the invention, prior art systems have a limited success rate of converting voice messages to textual messages due to an emphasis put on deriving textual messages based on the energy level of the analyzed speech signal. In contrast, the present invention takes advantage of analyzing the texture of the speech spectrum (described above as the degree of voiceness) along with the energy level of the speech signal. By utilizing both magnitude data of the spectral signal and degree of voiceness data for comparison to a phoneme library, the present invention provides a higher degree of accuracy for converting speaker-dependent and speaker-independent voice signals to a textual message.

Although the flowcharts of FIGS. 5–6 have been described as being processed singly by the processing system 210, in an alternative embodiment, flowchart 400 may be implemented according to the circuitry shown in FIG. 3. In this embodiment, the caller interface circuit 218 comprises a voice recognition system 221, a text-to-speech synthesizer 228, and a conventional voice recognition system 230.

The voice recognition system 221 comprises an interface circuit 223, and a processor 222. By way of the caller interface circuit 218, the interface circuit 223 of the voice recognition system 221 is directly connected to the PSTN 110 by way of line 101, or is directly connected to a telephone line 103 coupled to telephone 124 of FIG. 1, in which case, an ADC (analog-to-digital converter) 220 is used for converting the analog voice signals received to digital signals for processing by the processor 222. Additionally, the processor 222 includes a memory 224 and a conventional digital signal processor 226. The voice recognition system 221 is programmed to perform the functions described in step 417 of FIG. 5, which is more fully described in the flowchart of FIG. 6 and the foregoing detailed discussions pertaining thereto. The functions of the text-to-speech synthesizer 228, and the voice recognition system 230 are described according to the foregoing discussions of steps 418, and 420–426, respectively.

Figure 4:
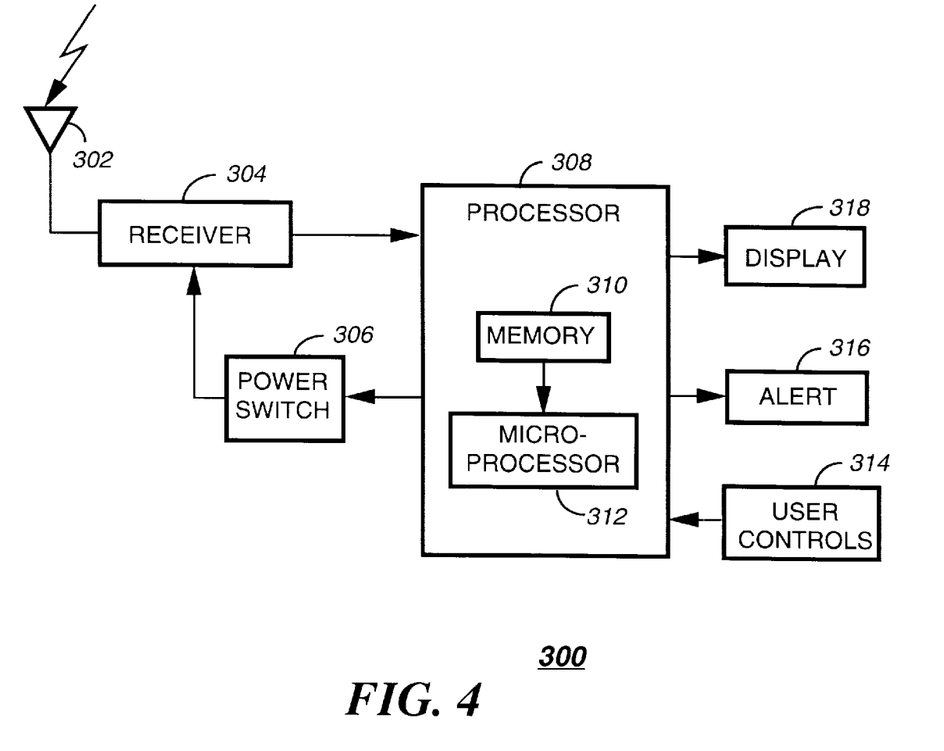
FIG. 4 shows an electrical block diagram of a SCR (selective call radio) according to the present invention.

Having summarized the fixed portion 102 of the radio communication system, we now turn to FIG. 4, which shows an electrical block diagram of an SCR 122 according to the present invention. As noted in step 426 of FIG. 5, the SCR 122 receives textual messages (in the form of, e.g., alphanumeric messages) generated by a caller after having been processed by the fixed portion 102 of the radio communication as described by the flowcharts of FIGS. 5–6. The SCR 122 comprises a receiver 304 coupled to an antenna 302, a power switch 308, a processor 310, an alerting device 322, and a user interface 321. The receiver 304 and antenna 302 are conventional RF elements for receiving messages transmitted by the base stations 116. The power switch 308 is a conventional switch, such as a MOS (metal oxide semiconductor) switch for controlling power to the receiver 304 under the direction of the processor 310, thereby providing a battery saving function.

The processor 310 is used for controlling operation of the SCR 122. Generally, its primary function is to decode and process demodulated messages provided by the receiver 304, storing them and alerting a user of the received message. To perform this function, the processor 310 comprises a conventional microprocessor 316 coupled to a conventional memory 318 including nonvolatile and volatile memory portions, such as a ROM (read-only memory) and RAM (random-access memory). One of the uses of the memory 318 is for storing messages received from the base stations 116. Another use is for storing one or more selective call addresses utilized in identifying incoming messages belonging to the SCR 122.

Once a message has been decoded and stored in the memory 318, the processor 310 activates the alerting device 322 which generates a tactile and/or audible alert signal to the user. The user interface 321, which includes, for example, a conventional LCD display 324 and conventional user controls 320, is utilized by the user for processing the received messages. This interface provides options such as reading, deleting, and locking of messages.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a voice recognition system, a method comprising the steps of:

sampling a voice signal;

applying a Fourier transform to a plurality of frame intervals of the sampled voice signal to generate spectral data having a spectral envelope for each of the plurality of frame intervals;

subdividing the spectral data for each of the plurality of frame intervals into a plurality of bands;

filtering out the spectral envelope from the spectral data of each of the plurality of frame intervals to generate filtered spectral data for each of the plurality of frame intervals;

applying a Fourier transform to the filtered spectral data for each of the plurality of bands to generate an autocorrelation function for each of the plurality of bands;

measuring a value of the magnitude of the autocorrelation function for each of the plurality of bands, whereby the value is a measure of a degree of voiceness for each of the plurality of bands;

applying the degree of voiceness for each of the plurality of bands to a corresponding plurality of phoneme models; and deriving a textual equivalent of speech from the voice signal by searching through a phoneme library according to predictions made by the corresponding plurality of phoneme models.

2. The method as recited in claim 1, further comprising the steps of:

determining an average magnitude for each of the plurality of bands;

applying a logarithmic function to the average magnitude to generate a converted average magnitude;

decorrelating the converted average magnitude to generate spectral envelope features; and applying the spectral envelope features for each of the plurality of bands to the corresponding plurality of phoneme models.

3. The method as recited in claim 1, wherein the value of the magnitude of the autocorrelation function is a peak magnitude.

4. The method as recited in claim 1, wherein for each of the plurality of frame intervals, the value of the magnitude of the autocorrelation function for each of the plurality of bands is determined by:

summing the autocorrelation function of each of the plurality of bands to generate a composite autocorrelation function;

determining a peak magnitude of the composite autocorrelation function;

determining from the peak magnitude a corresponding frequency mark; and utilizing the corresponding frequency mark to determine a corresponding magnitude value for each of the plurality of bands.

5. The method as recited in claim 1, further comprising the step of normalizing the autocorrelation function for each of the plurality of bands by its corresponding spectral band energy.

6. The method as recited in claim 1, wherein the Fourier transform comprises a fast Fourier transform.

7. The method as recited in claim 1, wherein the step of filtering out the spectral envelope comprises the steps of:

averaging the spectral data of each of the plurality of frame intervals to generate a spectral envelope estimate; and subtracting the spectral envelope estimate from the spectral data of each of the plurality of frame intervals.

8. In a radio communication system comprising a plurality of selective call radios and the voice recognition system and its method as recited in claim 1, a method comprising the steps of:

translating with the voice recognition system a message initiated by a caller of the radio communication system to a textual speech message, wherein the message is intended for a selective call radio; and transmitting the textual speech message to at least one of the plurality of selective call radios.

9. The method as recited in claim 8, further comprising the steps of:

translating the textual equivalent of speech to a voice test signal;

transmitting the voice test signal and voice instructions to the caller, wherein the voice instructions define how the caller is to generate a confirmation response signal; and interacting with the caller to correct the textual equivalent of speech if the confirmation response signal indicates that the textual equivalent of speech is flawed.

10. The method as recited in claim 9, wherein an option for correcting the textual equivalent of speech comprises an instruction from the caller to discard the textual equivalent of speech and to sample a new voice signal representative of the message intended for the selective call radio.

11. The method as recited in claim 9, wherein an option for correcting the textual equivalent of speech comprises an instruction from the caller to selectively correct at least one word of the textual equivalent of speech according to voice signals generated by the caller representative of the at least one corrected word.

12. In a voice recognition system, a method comprising the steps of:

sampling a voice signal;

applying a fast Fourier transform to a plurality of frame intervals of the sampled voice signal to generate spectral data having a spectral envelope for each of the plurality of frame intervals;

subdividing the spectral data for each of the plurality of frame intervals into a plurality of bands;

filtering out the spectral envelope from the spectral data of each of the plurality of frame intervals to generate filtered spectral data for each of the plurality of frame intervals;

applying a fast Fourier transform to the filtered spectral data for each of the plurality of bands to generate an autocorrelation function for each of the plurality of bands;

measuring a peak magnitude of the autocorrelation function for each of the plurality of bands, whereby the peak magnitude is a measure of a degree of voiceness for each of the plurality of bands;

applying the degree of voiceness for each of the plurality of bands to a corresponding plurality of phoneme models; and deriving a textual equivalent of speech from the voice signal by searching through a phoneme library according to predictions made by the corresponding plurality of phoneme models.

13. The method as recited in claim 12, further comprising the steps of:

determining an average magnitude for each of the plurality of bands;

applying a logarithmic function to the average magnitude to generate a converted average magnitude;

decorrelating the converted average magnitude to generate spectral envelope features; and applying the spectral envelope features for each of the plurality of bands to the corresponding plurality of phoneme models.

14. A voice recognition system, comprising:

an interface circuit for receiving voice signals; and a processor coupled to the interface circuit, wherein the processor is adapted to:

cause the interface circuit to sample a voice signal;

apply a Fourier transform to a plurality of frame intervals of the sampled voice signal to generate spectral data having a spectral envelope for each of the plurality of frame intervals;

subdivide the spectral data for each of the plurality of frame intervals into a plurality of bands;

filter out the spectral envelope from the spectral data of each of the plurality of frame intervals to generate filtered spectral data for each of the plurality of frame intervals;

apply a Fourier transform to the filtered spectral data for each of the plurality of bands to generate an autocorrelation function for each of the plurality of bands;

measure a value of the magnitude of the autocorrelation function for each of the plurality of bands, whereby the value is a measure of a degree of voiceness for each of the plurality of bands;

apply the degree of voiceness for each of the plurality of bands to a corresponding plurality of phoneme models; and derive a textual equivalent of speech from the voice signal by searching through a phoneme library according to predictions made by the corresponding plurality of phoneme models.

15. The voice recognition system as recited in claim 14, wherein the interface circuit comprises an analog-to-digital converter for digitizing analog voice messages.

16. The voice recognition system as recited in claim 14, wherein the processor is further adapted to:

determine an average magnitude for each of the plurality of bands;

apply a logarithmic function to the average magnitude to generate a converted average magnitude;

decorrelate the converted average magnitude to generate spectral envelope features; and apply the spectral envelope features for each of the plurality of bands to the corresponding plurality of phoneme models.

17. A radio communication system, comprising:

a caller interface circuit comprising the voice recognition system as recited in claim 14 for receiving caller initiated messages;

a transmitter for transmitting messages to a plurality of selective call radios; and a processing system coupled to the caller interface circuit, and the transmitter, wherein the processing system is adapted to:

cause the caller interface circuit to receive from a caller a message intended for a selective call radio;

cause the caller interface circuit to derive a textual equivalent of speech from the message; and cause the transmitter to transmit the textual equivalent of speech to the selective call radio, wherein the textual equivalent of speech is representative of the message initiated by the caller.

18. The radio communication system as recited in claim 17, wherein the interface circuit of the voice recognition system comprises an analog-to-digital converter for digitizing analog voice messages.

19. The radio communication system as recited in claim 17, wherein the caller interface circuit further comprises:

a text-to-speech synthesizer, wherein the processing system is further adapted to:

cause text-to-speech synthesizer to translate the textual equivalent of speech to a voice test signal;

cause the caller interface circuit to transmit the voice test signal and voice instructions to the caller, wherein the voice instructions define how the caller is to generate a confirmation response signal to the caller interface circuit; and cause the voice recognition system to interact with the caller to correct the textual equivalent of speech if the confirmation response signal indicates that the textual equivalent of speech is flawed.

20. The radio communication system as recited in claim 19, wherein an option for correcting the textual equivalent of speech comprises an instruction from the caller to discard the textual equivalent of speech and to sample a new voice signal representative of the message intended for the selective call radio.

21. The radio communication system as recited in claim 19, wherein an option for correcting the textual equivalent of speech comprises an instruction from the caller to selectively correct at least one word of the textual equivalent of speech according to voice signals generated by the caller representative of the at least one corrected word.

22. A radio communication system, comprising:

an caller interface circuit for receiving caller initiated messages;

a transmitter for transmitting messages to a plurality of selective call radios; and a processing system coupled to the caller interface circuit, and the transmitter, wherein the processing system is adapted to:

cause the caller interface circuit to sample a voice signal generated by a caller during a plurality of frame intervals, wherein the voice signal is representative of a message intended for a selective call radio;

apply a Fourier transform to a plurality of frame intervals of the sampled voice signal to generate spectral data having a spectral envelope for each of the plurality of frame intervals;

subdivide the spectral data for each of the plurality of frame intervals into a plurality of bands;

filter out the spectral envelope from the spectral data of each of the plurality of frame intervals to generate filtered spectral data for each of the plurality of frame intervals;

apply a Fourier transform to the filtered spectral data for each of the plurality of bands to generate an autocorrelation function for each of the plurality of bands;

measure a value of the magnitude of the autocorrelation function for each of the plurality of bands, whereby the value is a measure of a degree of voiceness for each of the plurality of bands;

apply the degree of voiceness for each of the plurality of bands to a corresponding plurality of phoneme models;

derive a textual equivalent of speech from the voice signal by searching through a phoneme library according to predictions made by the corresponding plurality of phoneme models; and cause the transmitter to transmit the textual equivalent of speech to the selective call radio, wherein the textual equivalent of speech is representative of the message initiated by the caller.

23. The radio communication system as recited in claim 22, wherein the processing system is further adapted to:

determine an average magnitude for each of the plurality of bands;

apply a logarithmic function to the average magnitude to generate a converted average magnitude;

decorrelate the converted average magnitude to generate spectral envelope features; and apply the spectral envelope features for each of the plurality of bands to the corresponding plurality of phoneme models.

24. The radio communication system as recited in claim 22, wherein the processing system is further adapted to:

translate the textual equivalent of speech to a voice test signal;

transmit the voice test signal and voice instructions to the caller, wherein the voice instructions define how the caller is to generate a confirmation response signal to the caller interface circuit; and interact with the caller to correct the textual equivalent of speech if the confirmation response signal indicates that the textual equivalent of speech is flawed.

25. The radio communication system as recited in claim 24, wherein an option for correcting the textual equivalent of speech comprises an instruction from the caller to discard the textual equivalent of speech and to sample a new voice signal representative of the message intended for the selective call radio.

26. The radio communication system as recited in claim 24, wherein an option for correcting the textual equivalent of speech comprises an instruction from the caller to selectively correct at least one word of the textual equivalent of speech according to voice signals generated by the caller representative of the at least one corrected word.

* * * * *